(12) United States Patent
Sakairi et al.

(10) Patent No.: US 9,623,714 B2
(45) Date of Patent: Apr. 18, 2017

(54) SYNTHETIC RESIN-MADE SLIDING BEARING

(71) Applicants: OILES CORPORATION, Tokyo (JP); OILES DEUTSCHLAND GMBH, Ober-Moerlen (DE)

(72) Inventors: Yoshikazu Sakairi, Fujisawa (JP); Katsunori Saito, Fujisawa (JP); Robert Hamrodi, Ober-Moerlen (DE); Kai Metzler, Ober-Moerlen (DE); Yoshiteru Igarashi, Ober-Moerlen (DE)

(73) Assignees: OILES CORPORATION, Tokyo (JP); OILES DEUTSCHLAND GMBH, Ober-Moerlen (DE)

( * ) Notice: Subject to any disclaimer, the term of this patent is extended or adjusted under 35 U.S.C. 154(b) by 0 days.

(21) Appl. No.: 14/763,712

(22) PCT Filed: Jan. 27, 2014

(86) PCT No.: PCT/JP2014/000403
§ 371 (c)(1),
(2) Date: Jul. 27, 2015

(87) PCT Pub. No.: WO2014/119281
PCT Pub. Date: Aug. 7, 2014

(65) Prior Publication Data
US 2015/0354629 A1    Dec. 10, 2015

(30) Foreign Application Priority Data

Jan. 29, 2013 (JP) .................................. 2013-014731

(51) Int. Cl.
*F16C 33/20* (2006.01)
*F16C 17/10* (2006.01)
(Continued)

(52) U.S. Cl.
CPC ............ *B60G 15/068* (2013.01); *F16C 17/04* (2013.01); *F16C 17/10* (2013.01); *F16C 33/20* (2013.01);
(Continued)

(58) Field of Classification Search
CPC .......... F16C 17/10; F16C 33/20; F16C 33/74; F16C 2208/00; F16C 2361/53; F16C 35/02; B60G 15/68; B60G 2204/18
(Continued)

(56) References Cited

U.S. PATENT DOCUMENTS 4,854,745 A * 8/1989 Kamimura ........... B60G 15/068
384/124
5,476,326 A * 12/1995 Ueno .................... B60G 15/067
384/125
(Continued)

FOREIGN PATENT DOCUMENTS

DE    102010011816 A1 * 9/2011 ........... B60G 15/067
DE    102010036242 A1 * 3/2012 ........... B60G 15/067
(Continued)

OTHER PUBLICATIONS

International Search Report for PCT/JP2014/000403 mailed May 13, 2014, four pages.
(Continued)

Primary Examiner — Marcus Charles
(74) Attorney, Agent, or Firm — Nixon & Vanderhye P.C.

(57) ABSTRACT

A synthetic resin-made sliding bearing 1 includes a synthetic resin-made upper casing 2 which is fixed to a mounting member on a vehicle body side; a reinforced synthetic resin-made lower casing 3 which is superposed on the upper casing 2 so as to be rotatable about an axis O in a circumferential direction R relative to the upper casing 2; a metallic reinforcing member 4; and a synthetic resin-made sliding
(Continued)

bearing piece 5 disposed in a space S between the upper casing 2 and the lower casing 3.

12 Claims, 11 Drawing Sheets

(51) Int. Cl.
 *B60G 15/06* (2006.01)
 *F16C 17/04* (2006.01)
 *F16C 33/74* (2006.01)

(52) U.S. Cl.
 CPC ........ *B60G 2204/418* (2013.01); *F16C 33/74* (2013.01); *F16C 2208/00* (2013.01); *F16C 2361/53* (2013.01)

(58) Field of Classification Search
 USPC ....... 384/123–125, 147, 226, 297, 303, 420, 384/590, 153
 See application file for complete search history.

(56) References Cited

U.S. PATENT DOCUMENTS

| | | | | |
|---|---|---|---|---|
| 7,293,918 | B2* | 11/2007 | Watai | F16C 17/04 384/124 |
| 8,016,489 | B2* | 9/2011 | Kaneko | F16C 17/04 384/147 |
| 2006/0215944 | A1 | 9/2006 | Watai et al. | |
| 2007/0237439 | A1 | 10/2007 | Watai et al. | |
| 2008/0310780 | A1 | 12/2008 | Watai et al. | |
| 2009/0180719 | A1* | 7/2009 | Miyata | F16C 17/04 384/147 |
| 2011/0019951 | A1* | 1/2011 | Kaneko | B60G 11/15 384/420 |
| 2011/0194793 | A1 | 8/2011 | Kaneko et al. | |
| 2011/0262070 | A1* | 10/2011 | Zernickel | B60G 15/068 384/618 |
| 2012/0243814 | A1* | 9/2012 | Sakairi | B60G 15/068 384/297 |
| 2013/0142462 | A1 | 6/2013 | Morishige et al. | |
| 2014/0112605 | A1 | 4/2014 | Morishige et al. | |
| 2014/0355916 | A1 | 12/2014 | Morishige et al. | |
| 2015/0316099 | A1 | 11/2015 | Morishige et al. | |

FOREIGN PATENT DOCUMENTS

| | | | | |
|---|---|---|---|---|
| DE | 102011085557 A1 | * | 5/2013 | ........... B60G 15/068 |
| DE | 102011087167 A1 | * | 5/2013 | ........... B60G 15/068 |
| DE | 102012202156 A1 | * | 9/2013 | ........... B60G 15/067 |
| EP | 1 548 303 | | 6/2005 | |
| EP | 1 555 144 | | 7/2005 | |
| EP | 2380762 A1 | * | 10/2011 | ............. B60G 11/16 |
| JP | 8-159160 | | 6/1996 | |
| JP | 2004225754 A | * | 8/2004 | ............. F16C 33/74 |
| JP | 2004-293589 | | 10/2004 | |
| JP | 2009-250278 | | 10/2009 | |
| JP | 2010-53908 | | 3/2010 | |
| JP | 2011-169469 | | 9/2011 | |
| JP | 2012-36983 | | 2/2012 | |
| WO | WO 2012/017591 | | 2/2012 | |
| WO | WO 2012/169130 | | 12/2012 | |

OTHER PUBLICATIONS

Chinese Office Action issued in App. No. 201480006357.9 dated Oct. 10, 2016 (w/ translation).

Extended European Search Report issued in App. No. 14746230.3 dated Sep. 8, 2016.

* cited by examiner

SYNTHETIC RESIN-MADE SLIDING BEARING

CROSS REFERENCE TO RELATED APPLICATIONS

This application is the U.S. national phase of International Application No. PCT/JP2014/000403 filed 27 Jan. 2014 which designated the U.S. and claims priority to JP Patent Application No. 2013-014731 filed 29 Jan. 2013, the entire contents of each of which are hereby incorporated by reference.

TECHNICAL FIELD

The present invention relates to a synthetic resin-made sliding bearing, and more particularly to a synthetic resin-made sliding bearing which is suitably incorporated as a sliding bearing of a strut-type suspension (Macpherson type) in a four-wheeled motor vehicle.

BACKGROUND ART

In general, a strut-type suspension is mainly used for a front wheel of a four-wheeled motor vehicle, and is so arranged that a strut assembly incorporating a hydraulic shock absorber in an outer cylinder integrated with a main shaft is combined with a suspension coil spring. Among such suspensions, there is a type of structure in which the axis of the suspension coil spring is actively offset with respect to the axis of the strut, so as to allow the sliding of a piston rod of the shock absorber incorporated in the strut to be effected smoothly, and there is another type of structure in which the axis of the suspension coil spring is arranged in alignment with the axis of the strut. In either structure, a rolling bearing using balls or needles or a synthetic resin-made sliding bearing is disposed between a mounting member for a motor vehicle body and an upper spring seat member of the suspension coil spring to allow the rotation to be effected smoothly when the strut assembly rotates together with the suspension coil spring by the steering operation.

PRIOR ART DOCUMENTS

Patent Documents

[Patent Document 1] JP-A-2004-293589
[Patent Document 2] JP-A-2009-250278

Incidentally, since the upper spring seat member, on which the aforementioned bearing is disposed, is generally made of sheet metal and is therefore relatively heavy, and since the upper spring seat member made of sheet metal needs to be provided with coating for rust prevention, even if the synthetic resin-made sliding bearing is used instead of the expensive rolling bearing to attain the light weight and a low price of the undercarriage of the motor vehicle, there are limits to such attempts for the light weight and the low price owing to the weight, manufacturing cost, assembly cost, and the like of the upper spring seat member.

In Patent Document 1, a sliding bearing is proposed which is comprised of a synthetic resin-made upper casing having a vehicle body-side bearing surface for a vehicle body side and an annular lower surface; a reinforced synthetic resin-made lower casing which contains reinforced fibers and is superposed on the upper casing so as to be rotatable about the axis of the upper casing, and which has an annular upper surface opposed to the annular lower surface of the upper casing; and a synthetic resin-made annular thrust sliding bearing piece and a tubular radial bearing piece which are interposed between the annular lower surface and the annular upper surface, wherein a spring bearing surface for a suspension coil spring is integrally formed on a portion of the lower casing on an outer peripheral side of the vehicle body-side bearing surface and the thrust sliding bearing piece.

In addition, in Patent Document 2, a thrust sliding bearing is proposed which is comprised of a synthetic resin-made upper casing which has a vehicle body-side bearing surface for a vehicle body side and an annular lower surface; a reinforced synthetic resin-made lower casing which contains reinforced fibers and is superposed on the upper casing so as to be rotatable about an axis of the upper casing, and on which an annular upper surface opposed to the annular lower surface and a spring bearing surface for a suspension coil spring are integrally formed; and a thrust sliding bearing piece which is disposed in an annular gap between the annular lower surface and the annular upper surface, and has an annular thrust sliding bearing surface which is slidably brought into contact with at least one of the annular lower surface and the annular upper surface, wherein the vehicle body-side bearing surface, the thrust sliding bearing surface, and the spring bearing surface are arranged by being juxtaposed to each other in an axial direction.

According to these sliding bearings, since the reinforced synthetic resin-made lower casing containing reinforced fibers has the spring bearing surface for the suspension coil spring, it is possible to omit the spring seat member made of sheet metal, so that it is possible to eliminate a weight increase ascribable to the upper spring seat member made of sheet metal and a price increase ascribable to such as the fabrication, coating, and assembly of the upper spring seat member made of sheet metal, thereby making it possible to attain the light weight and a low price of the undercarriage of the motor vehicle.

SUMMARY OF THE INVENTION

Problems that the Invention is to Solve

However, since the lower casing, which is one of the sliding mating surfaces of the above-described sliding bearing, is formed of a reinforced synthetic resin containing a reinforcing filler such as glass fibers, if sliding occurs between the synthetic resin-made sliding bearing and that lower casing, a problem can possibly occur in that slidability declines, thereby causing the smoothness of the steering operation to decline.

The present invention has been devised in view of the above-described aspects, and its object is to provide a synthetic resin-made sliding bearing which is capable of preventing the sliding between the synthetic resin-made sliding bearing and the reinforced synthetic resin-made lower casing to avoid the decline of the slidability, thereby making it possible to maintain smooth steering operation.

Means for Overcoming the Problems

A synthetic resin-made sliding bearing in accordance with the present invention comprises: a synthetic resin-made upper casing, a reinforced synthetic resin-made lower casing superposed on the upper casing so as to be rotatable about an axis relative to the upper casing, and a synthetic resin-made sliding bearing piece disposed between the upper casing and the lower casing, wherein the upper casing includes: an annular upper casing base portion having an annular lower surface; an inner peripheral-side cylindrical suspended portion suspended from a radial inner peripheral end portion of an annular lower surface of the upper casing base portion; an outer peripheral-side cylindrical suspended portion suspended from a radial outer peripheral end portion of the annular lower surface of the upper casing base portion; an annular upper flat portion extending radially outwardly from a lower end portion of the outer peripheral-side cylindrical suspended portion; an annular engaging suspended portion suspended from a radially outer peripheral end portion of the annular upper flat portion; and an engaging bugled portion having an annular inclined engaging surface and bulging radially inwardly from a radially inner surface of a lower portion of the annular engaging suspended portion, wherein the lower casing includes: an annular lower casing base portion which has an annular upper surface and a cylindrical inner peripheral surface; a cylindrical protruding portion which has a cylindrical inner peripheral surface continuously connected to the cylindrical inner peripheral surface of the lower casing base portion and protrudes downwardly from a lower surface of a radially inner peripheral end portion of the lower casing base portion; an annular protruding portion which protrudes upwardly from the annular upper surface of the lower casing base portion; an annular lower flat portion extending radially outwardly from a radially outer peripheral lower end portion of the lower casing base portion; an annular engaged protruding portion which protrudes upwardly from a radially outer peripheral end portion of the annular lower flat portion; an engaged bulged portion bulging radially outwardly from a radially outer surface of an upper portion of the annular engaged protruding portion and having an annular inclined engaged surface; and at least one engaging hole portion which is formed in an annular upper surface of the annular protruding portion so as to be open at the annular upper surface and to extend downwardly from the annular upper surface, and wherein the sliding bearing piece includes: an annular thrust sliding bearing piece portion having an annular upper surface, an annular lower surface, and at least one engaging protruding portion which projects downwardly from the annular lower surface and is fittingly inserted in the engaging hole portion of the lower casing; and a cylindrical radial sliding bearing piece portion which, at an one end portion thereof, is integrally formed on one end portion of the thrust sliding bearing piece portion in such a manner as to extend downwardly from the one annular end portion of the thrust sliding bearing piece portion, and has a cylindrical inner peripheral surface and a cylindrical outer peripheral surface, the sliding bearing piece being disposed between the upper casing and the lower casing such that the annular upper surface of the thrust sliding bearing piece portion is brought into slidable contact with the annular lower surface of the upper casing base portion, and the annular lower surface of the thrust sliding bearing piece portion is brought into contact with the annular upper surface of the annular protruding portion, and such that the cylindrical inner peripheral surface of the radial sliding bearing piece portion is brought into contact with a cylindrical outer peripheral surface of the lower casing base portion and a cylindrical outer peripheral surface of the annular protruding portion, and the cylindrical outer peripheral surface of the radial sliding bearing piece portion is brought into slidable contact with a cylindrical inner peripheral surface of the outer peripheral-side cylindrical suspended portion, the upper casing being combined with the lower casing by causing an inclined engaging surface thereof to be resiliently fitted to the inclined engaged surface of the lower casing.

According to such a sliding bearing, as the engaging protruding portion on the annular lower surface of the thrust sliding bearing piece is fittingly inserted in the engaging hole portion of the annular protruding portion of the lower casing base portion, the rotation of the sliding bearing piece in the circumferential direction about the axis relative to the lower casing is restrained, and therefore the sliding bearing piece is fixed to the lower casing. As a result, the sliding is confined to the sliding between the synthetic resins excellent in the sliding characteristics between the annular upper surface of the thrust sliding bearing piece and the annular lower surface of the upper casing base portion and to the sliding between the synthetic resins excellent in the sliding characteristics between the cylindrical outer peripheral surface of the radial sliding bearing piece portion and the cylindrical inner peripheral surface of the outer peripheral-side cylindrical suspended portion; therefore, smooth steering operation is performed.

In the synthetic resin-made sliding bearing in accordance with the present invention, the upper casing may further include an inner annular suspended portion which has a cylindrical inner peripheral surface continuously connected to a cylindrical inner peripheral surface of the outer peripheral-side cylindrical suspended portion and is suspended from a radially inner peripheral end portion of the annular upper flat portion; and an outer annular suspended portion suspended from the annular lower surface of the annular upper flat portion, so as to form an inner annular recessed portion radially inwardly in cooperation with the radially outer peripheral surface of the inner annular suspended portion and the annular lower surface of the annular upper flat portion and to form an outer annular recessed portion radially outwardly in cooperation with the radially inner peripheral surface of the annular engaging suspended portion and the annular lower surface of the annular upper flat portion. In addition, the lower casing may further include an annular projecting portion projecting upwardly from the annular upper surface of the annular lower flat portion so as to form an inner annular recessed portion radially inwardly in cooperation with the cylindrical outer peripheral surface of the lower casing base portion and the annular upper surface of the annular lower flat portion and to form an outer annular recessed portion in cooperation with a radially inner peripheral surface of the annular engaged protruding portion and the annular upper surface of the annular lower flat portion; and an annular stepped portion formed by a radially inner end portion of the annular upper surface of the lower casing base portion and a cylindrical inner peripheral surface of the annular protruding portion adjacent to that end portion. In these cases, the synthetic resin-made sliding bearing in accordance with the present invention may be arranged such that sealing portions for performing labyrinth action are formed in an overlapped section between and including the annular projecting portion of the lower casing, on the one hand, and the inner annular suspended portion and the outer annular suspended portion of the upper casing, on the other hand, and in a resiliently fitted section between and including the inclined engaging surface and the inclined engaged surface, by overlapping the annular projecting portion of the lower casing with each of the inner annular suspended portion and the outer annular suspended portion of the upper casing and by resiliently the inclined engaging surface to the inclined engaged surface.

According to such a sliding bearing, as sealing portions for performing labyrinth action are formed on the outer peripheral side of the sliding bearing, it is possible to prevent the ingress from the outer peripheral side of dust and the like onto the sliding surfaces of the annular upper surface of the thrust sliding bearing piece portion and the annular lower surface of the upper casing base portion and onto the sliding surfaces of the cylindrical outer peripheral surface of the radial sliding bearing piece portion and the cylindrical inner peripheral surface of the outer peripheral-side cylindrical suspended portion of the upper casing.

In the synthetic resin-made sliding bearing in accordance with the present invention, the lower casing may further include an annular flat plate portion integrally extending radially outwardly from the outer peripheral end portion of the annular lower flat portion of the lower casing base portion in such a manner as to be continuously connected to the inclined engaging surface of the annular engaging protruding portion.

According to such a sliding bearing, since the resiliently fitted section between and including the annular engaging suspended portion of the upper casing and the annular engaged protruding portion of the lower casing is covered by the annular flat plate portion, it is possible to further prevent the ingress of dust and the like onto the sliding surfaces from the annular clearance of that resiliently fitted section.

In the synthetic resin-made sliding bearing in accordance with the present invention, between the cylindrical outer peripheral surface of the outer peripheral-side cylindrical suspended portion of the upper casing and the annular upper surface of the annular upper flat portion, a plurality of reinforcing ribs which extend diagonally downwardly from that cylindrical outer peripheral surface to the annular upper surface may be formed in such as manner as to be arranged along the circumferential direction R.

According to such a sliding bearing, the flexural strength of the annular upper flat portion is enhanced by the plurality of reinforcing ribs, with the result that the annular clearance of the resiliently fitted section can be maintained constant over extended periods of time.

The synthetic resin-made sliding bearing in accordance with the present invention may further comprise a metallic reinforcing member which has a cylindrical portion and an annular collar portion extending radially outwardly from one end portion of the cylindrical portion. In this case, it suffices if the lower casing further includes an annular recessed groove which is formed in an annular lower surface of the cylindrical protruding portion, and an end portion of the cylindrical outer peripheral surface of the cylindrical protruding portion with the annular recessed groove formed therein is formed as an annular tapered surface which gradually expands radially outwardly toward the annular lower surface. Further, it suffices if the metallic reinforcing member is fitted to the lower casing by causing a cylindrical inner peripheral surface of the cylindrical portion to be brought into contact with the cylindrical outer peripheral surface of the cylindrical protruding portion and by causing an upper surface of the annular collar portion to be brought into contact with an annular lower surface of the lower casing base portion and an annular lower surface of the annular lower flat portion, and the reinforcing member at the cylindrical portion is prevented from coming off downwardly from the cylindrical protruding portion by the end portion of the cylindrical outer peripheral surface which is formed as the annular tapered surface of the end portion of the cylindrical protruding portion with the annular recessed groove formed therein and which is enlarged in diameter radially outwardly.

In the sliding bearing in such an example, flexibility in the radial direction is imparted by the annular recess groove to an end portion of the cylindrical protruding portion having the annular tapered surface, and the annular lower surface of the annular lower flat portion serving as the bearing surface of the suspension coil spring is preferably reinforced by such a metallic reinforcing member.

Further, in such a sliding bearing, since the annular recessed groove is formed on the annular lower surface of the cylindrical protruding portion, the fitting of the cylindrical portion of the reinforcing member over the cylindrical protruding portion can be effected easily by virtue of the easy diameter reducibility of the cylindrical outer peripheral surface at the lower end portion of the cylindrical protruding portion. After the fitting, since the reinforcing member is prevented from coming off downwardly by the end portion of the cylindrical outer peripheral surface of the cylindrical protruding portion whose diameter is enlarged in diameter outwardly in the radial direction of the lower casing, that reinforcing member and the lower casing can be handled as an integral unit during the period until the sliding bearing is mounted to the mounting member of the strut-type suspension, so that their handling is facilitated.

The thrust sliding bearing piece portion of the sliding bearing piece may have pluralities of inner recessed portions and outer recessed portions which are formed in an annular upper surface thereof along a circumferential direction and in at least two rows including an inner row and an outer row in the radial direction, the inner recessed portions and the outer recessed portions may be arranged with phase differences with respect to each other in the circumferential direction, and the radial sliding bearing piece portion may have a plurality of axial grooves which are open at their both vertical ends and are formed on a cylindrical outer peripheral surface thereof by being spaced apart at equal intervals in the circumferential direction.

Each of the plurality of inner recessed portions may be defined by an inner circular arc-shaped wall surface extending in a circular arc shape about the axis as a center; an outer circular arc-shaped wall surface extending in a circular arc shape about the axis as the center radially outwardly of the inner circular arc-shaped wall surface; a pair of semicircular wall surfaces respectively continuously connected to the inner circular arc-shaped wall surface and the outer circular arc-shaped wall surface and opposed to each other in the circumferential direction; and a bottom wall surface continuously connected to respective ones of the inner circular arc-shaped wall surface, the outer circular arc-shaped wall surface, and the pair of semicircular wall surfaces. Furthermore, each of the plurality of outer recessed portions may be defined by an inner circular arc-shaped wall surface extending in a circular arc shape about the axis as a center; an outer circular arc-shaped wall surface extending in a circular arc shape about the axis as the center radially outwardly of the inner circular arc-shaped wall surface; a pair of semicircular wall surfaces respectively continuously connected to the inner circular arc-shaped wall surface and the outer circular arc-shaped wall surface and opposed to each other in the circumferential direction; and a bottom wall surface continuously connected to respective ones of the inner circular arc-shaped wall surface, the outer circular arc-shaped wall surface, and the pair of semicircular wall surfaces.

In addition, the thrust sliding bearing piece portion may have annular recessed grooves which are formed in an annular upper surface thereof along a circumferential direction and in at least two rows including an inner row and an outer row concentrically with each other in the radial direction.

The ratio of a total area of opening surfaces of the inner recessed portions and the outer recessed portions in surfaces which combine the opening surfaces of the inner recessed portions and the outer recessed portions and the annular upper surface of the thrust sliding bearing piece portion, the ratio of a total area of opening surfaces of the annular recessed portions in surfaces which combine the opening surfaces of the annular recessed portions and the annular upper surface of the thrust sliding bearing piece portion, or the ratio of a total area of opening surfaces of the inner recessed portions and the outer recessed portions and the opening surfaces of the annular recessed portions in surfaces which combine the opening surfaces of the inner recessed portions and the outer recessed portions, the opening surfaces of the annular recessed portions, and the annular upper surface of the thrust sliding bearing piece portion, is preferably 20 to 50%, more preferably 30 to 40%.

In these inner recessed portions and outer recessed portions as well as the annular recessed portions for retaining lubricating oil such as grease, it suffices if the ratio of the above-described total area is at least 20%. If this ratio exceeds 50%, the strength of the thrust sliding bearing piece portion is caused to decline, and plastic deformation such as creep is liable to occur.

The synthetic resin-made sliding bearing in accordance with the present invention is preferably used as a sliding bearing for a strut-type suspension of a four-wheeled motor vehicle.

The synthetic resin for forming the upper casing may be a thermoplastic synthetic resin such as polyacetal resin, polyamide resin, or polybutylene terephthalate resin, and the synthetic resin for forming the lower casing may be a reinforced thermoplastic synthetic resin such as polyacetal resin, polyamide resin, or polybutylene terephthalate resin containing 30 to 50% by mass of a reinforcing filler including glass fibers, glass powder, carbon fibers, and the like. As the synthetic resin for forming the sliding bearing piece, it is possible to cite a thermoplastic synthetic resin such as polyolefin resin including polyacetal resin, polyamide resin, polybutylene terephthalate resin, and polyester resin as preferred examples.

Advantages of the Invention

According to the present invention, it is possible to provide a synthetic resin-made sliding bearing which is capable of preventing the sliding between the synthetic resin-made sliding bearing and the reinforced synthetic resin-made lower casing to avoid the decline of the slidability, thereby making it possible to maintain smooth steering operation.

MODE FOR CARRYING OUT THE INVENTION

Figure 1:
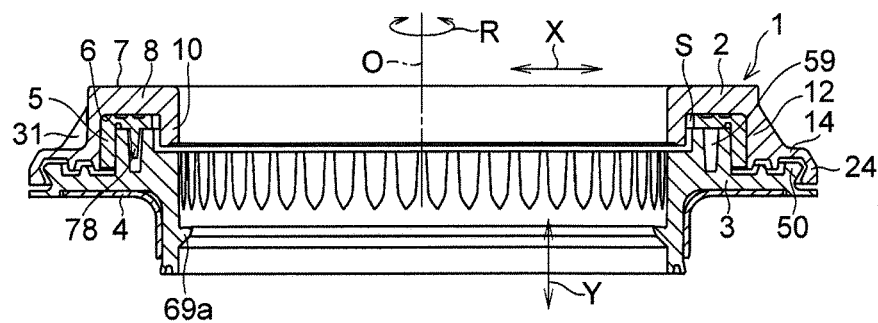
FIG. 1 is an explanatory cross-sectional view, taken in the direction of arrows along line I-I shown in FIG. 2, of a preferred embodiment of the present invention.
Figure 2:
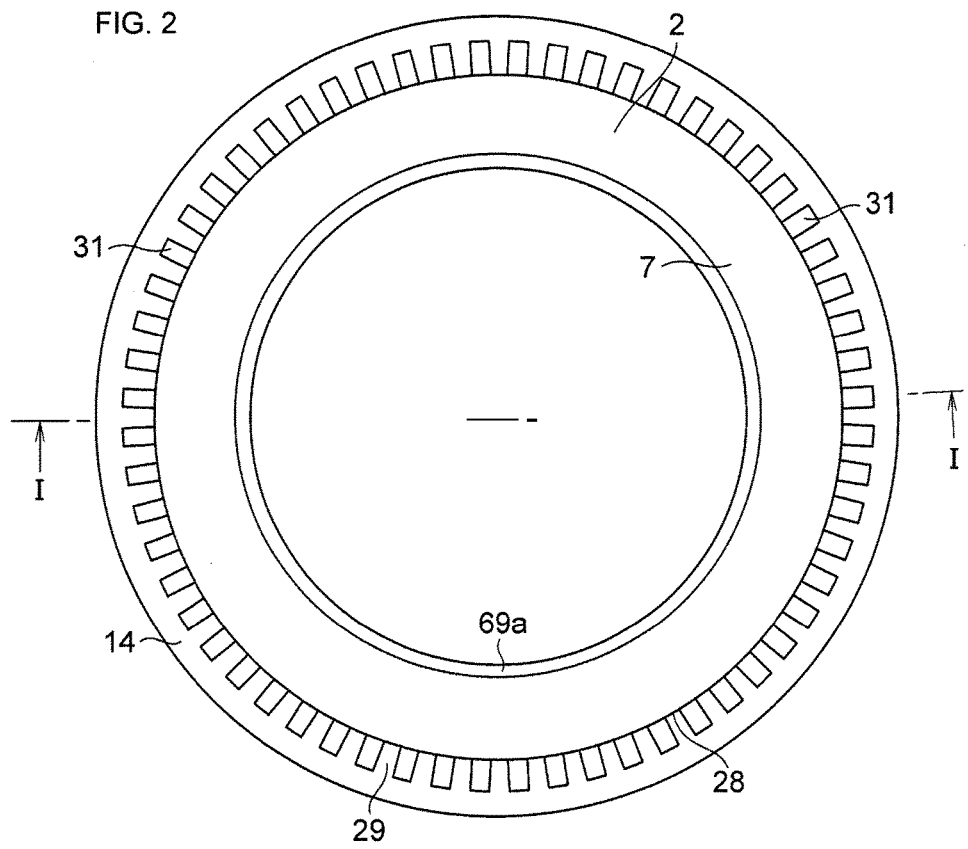
FIG. 2 is an explanatory plan view of the embodiment shown in FIG. 1.
Figure 3:
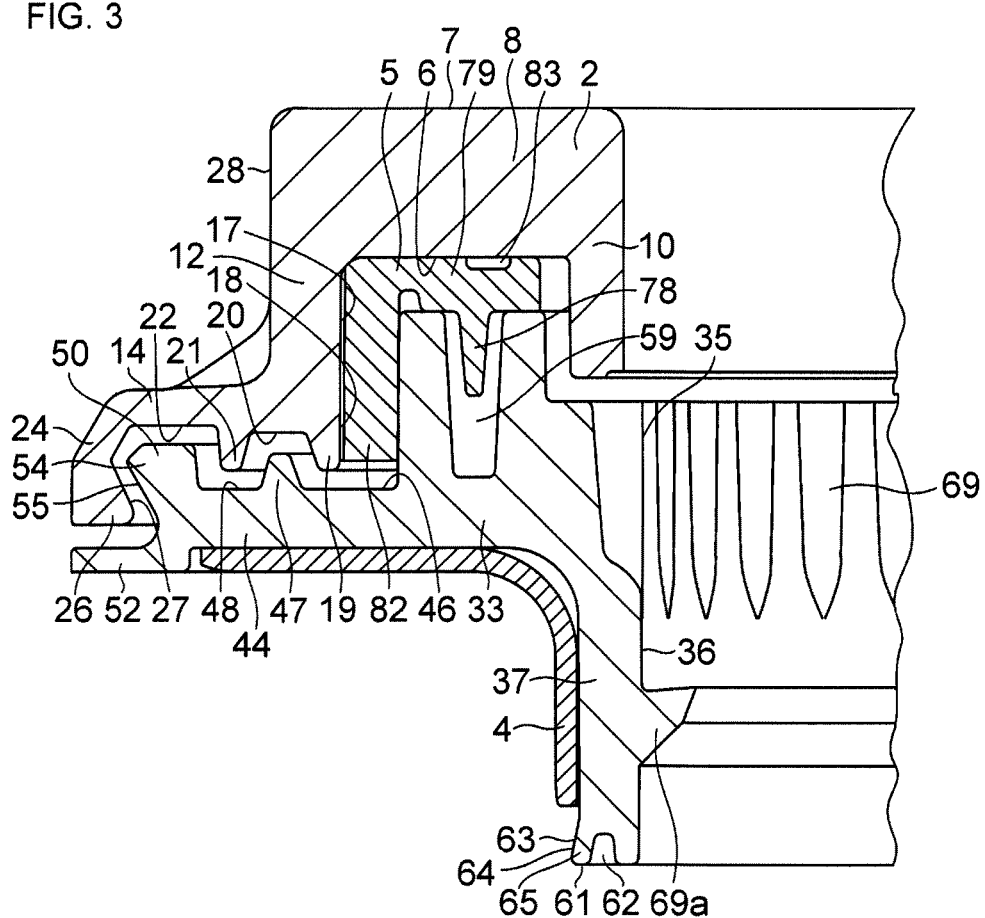
FIG. 3 is an explanatory partially enlarged cross-sectional view of the embodiment shown in FIG. 1.

In FIGS. 1 to 3, a synthetic resin-made sliding bearing 1 in accordance with this embodiment for use in a strut-type suspension of a four-wheeled motor vehicle is comprised of a synthetic resin-made upper casing 2 which is fixed to a mounting member on a vehicle body side; a reinforced synthetic resin-made lower casing 3 which is superposed on the upper casing 2 so as to be rotatable about an axis O in a circumferential direction R relative to the upper casing 2; a metallic reinforcing member 4; and a synthetic resin-made sliding bearing piece 5 disposed in a space S between the upper casing 2 and the lower casing 3.

Figure 4:
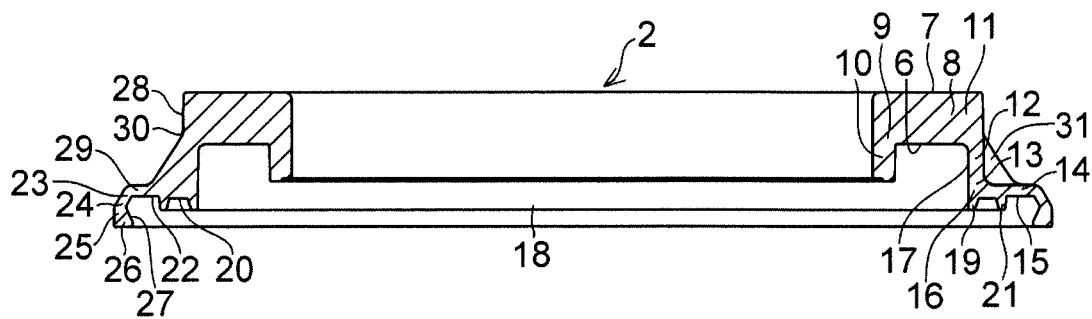
FIG. 4 is an explanatory cross-sectional view of an upper casing of the embodiment shown in FIG. 1.

As particularly shown in FIGS. 2 and 4, the upper casing 2 integrally includes an annular upper casing base portion 8 having an annular lower surface 6 and an annular upper surface 7 in an axial direction Y (a vertical direction); an inner peripheral-side cylindrical suspended portion 10 suspended from an inner peripheral end portion 9 in a radial direction X of the annular lower surface 6 of the upper casing base portion 8; an outer peripheral-side cylindrical suspended portion 12 suspended from an outer peripheral end portion 11 in the radial direction X of the annular lower surface 6 of the upper casing base portion 8; an annular upper flat portion 14 having an annular lower surface 15 and extending outwardly in the radial direction X from a lower end portion 13 of the outer peripheral-side cylindrical suspended portion 12; an inner annular suspended portion 19 which has a cylindrical inner peripheral surface 18 continuously connected to a cylindrical inner peripheral surface 17 of the outer peripheral-side cylindrical suspended portion 12 and is suspended from an inner peripheral end portion 16 in the radial direction X of the annular upper flat portion 14; an outer annular suspended portion 21 suspended from the annular lower surface 15 of the annular upper flat portion 14, so as to form an inner annular recessed portion 20 inwardly in the radial direction X in cooperation with the outer peripheral surface in the radial direction X of the inner annular suspended portion 19 and the annular lower surface 15 of the annular upper flat portion 14; an annular engaging suspended portion 24 suspended from an outer peripheral end portion 23 in the radial direction X of the annular upper flat portion 14, so as to form an outer annular recessed portion 22 inwardly in the radial direction X in cooperation with the outer peripheral surface in the radial direction X of the outer annular suspended portion 21 and the annular lower surface 15 of the annular upper flat portion 14; and an engaging bulged portion 26 having an inclined engaging surface 27 and bulging inwardly in the radial direction X from the inner surface in the radial direction X of a lower portion 25 of the annular engaging suspended portion 24. Thus, the outer annular suspended portion 21 is suspended from the annular lower surface 15 of the annular upper flat portion 14 so as to form the outer annular recessed portion 22 outwardly in the radial direction X in cooperation with the radial inner peripheral surface of the annular engaging suspended portion 24 and the annular lower surface 15 of the annular upper flat portion 14.

A cylindrical outer peripheral surface 28 of the outer peripheral-side cylindrical suspended portion 12 and an annular upper surface 29 of the annular upper flat portion 14 are connected by a plurality of reinforcing ribs 31 which extend diagonally downwardly from a lower end portion 30 of the cylindrical outer peripheral surface 28 to the annular upper surface 29, and the plurality of reinforcing ribs 31 are formed in such a manner as to be arranged along the circumferential direction R. Improvement of the flexural strength of the annular upper flat portion 14 is attained by these reinforcing ribs 31.

Figure 5:
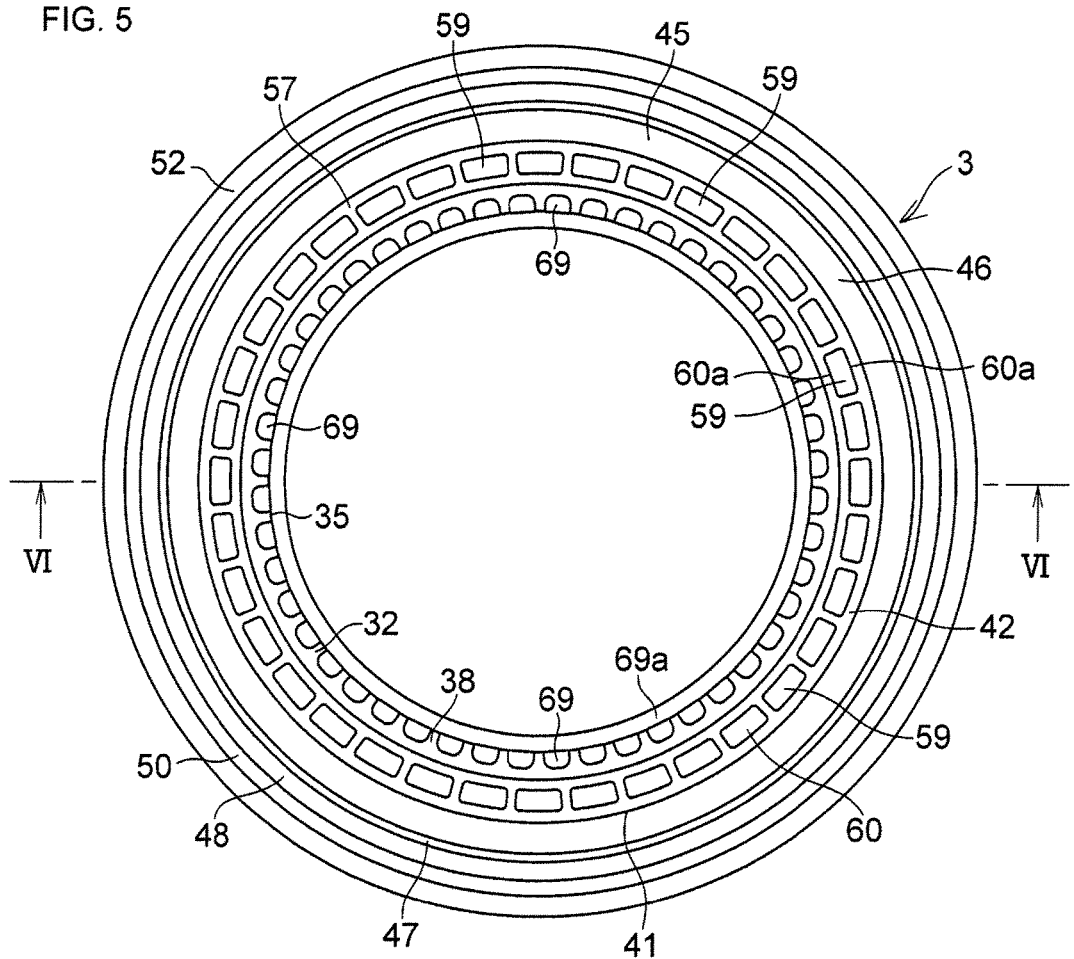
FIG. 5 is an explanatory cross-sectional view of a lower casing of the embodiment shown in FIG. 1.
Figure 6:
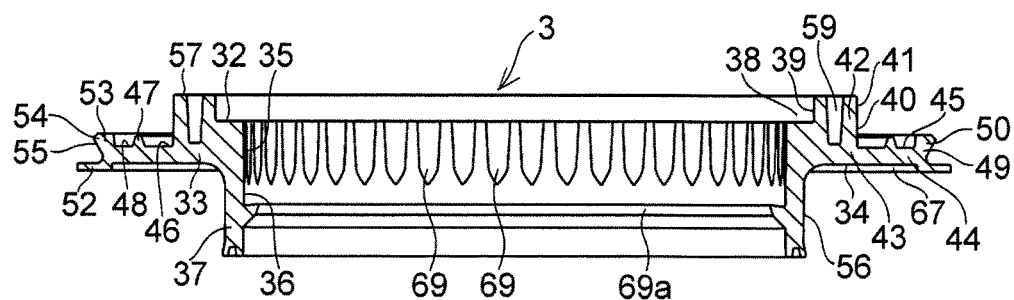
FIG. 6 is an explanatory cross-sectional view, taken in the direction of arrows along line VI-VI, of the lower casing shown in FIG. 5.
Figure 7:
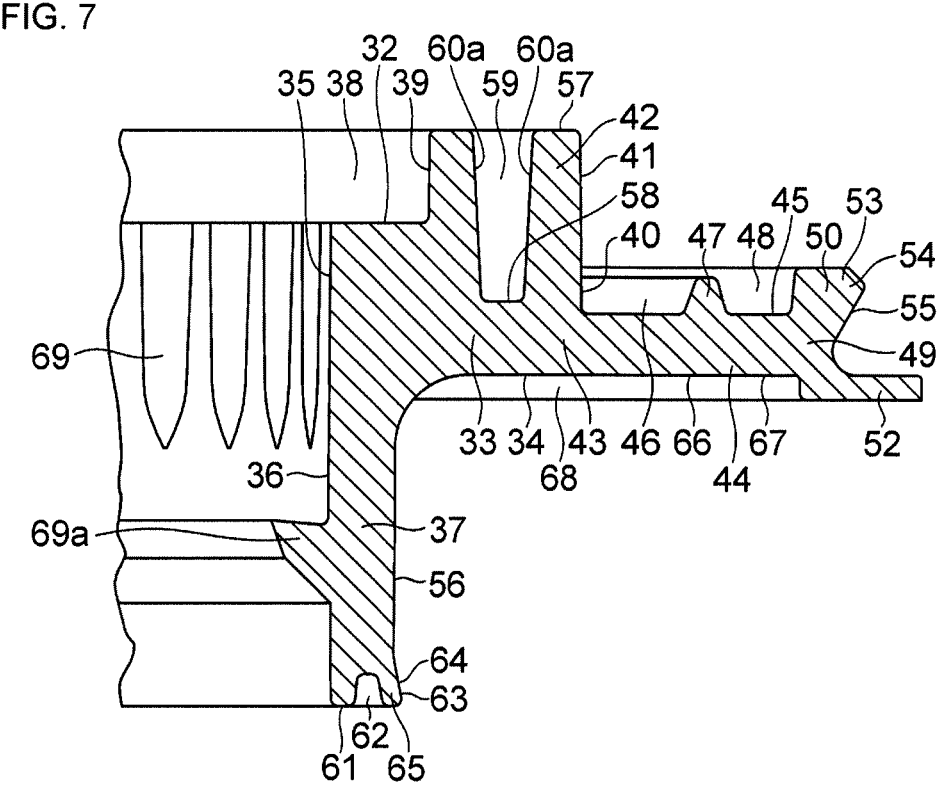
FIG. 7 is an explanatory partially enlarged cross-sectional view of the lower casing shown in FIG. 6.

As particularly shown in FIGS. 5 to 7, the lower casing 3 includes an annular lower casing base portion 33 which has an annular upper surface 32, an annular lower surface 34, and a cylindrical inner peripheral surface 35; a cylindrical protruding portion 37 which has a cylindrical inner peripheral surface 36 continuously connected to the cylindrical inner peripheral surface 35 of the lower casing base portion 33 and protrudes downwardly from an inner peripheral end portion in the radial direction X of the annular lower surface 34 of the lower casing base portion 33; an annular protruding portion 42 which protrudes upwardly from the annular upper surface 32 of the lower casing base portion 33 and has a cylindrical inner peripheral surface 39 and a cylindrical outer peripheral surface 41 continuously connected to a cylindrical outer peripheral surface 40 of the lower casing base portion 33; an annular stepped portion 38 formed by an inner end portion in the radial direction X of the annular upper surface 32 of the lower casing base portion 33 and the cylindrical inner peripheral surface 39 of the annular protruding portion 42 adjacent to that end portion; an annular lower flat portion 44 extending outwardly in the radial direction X from an outer peripheral lower end portion 43 in the radial direction X of the lower casing base portion 33; an annular projecting portion 47 projecting upwardly from the annular upper surface 45 of the annular lower flat portion 44 so as to form on an annular upper surface 45 of the annular lower flat portion 44 an inner annular recessed portion 46 inwardly in the radial direction X in cooperation with the cylindrical outer peripheral surface 40 of the lower casing base portion 33 and the annular upper surface 45 of the annular lower flat portion 44; an annular engaged protruding portion 50 which protrudes upwardly from an outer peripheral end portion 49 in the radial direction X of the annular lower flat portion 44 and forms an outer annular recessed portion 48 in cooperation with the outer peripheral surface in the radial direction X of the annular projecting portion 47 and the annular upper surface 45 of the annular lower flat portion 44; an annular flat plate portion 52 extending integrally outwardly in the radial direction X from the outer peripheral end portion 49 of the annular lower flat portion 44; an engaged bulged portion 54 bulging outwardly in the radial direction X from an outer surface in the radial direction X of an upper portion 53 of the annular engaged protruding portion 50 and having an annular inclined engaged surface 55; a plurality of engaging hole portions 59 which are formed in an annular upper surface 57 of the annular protruding portion 42 so as to be open at the annular upper surface 57 and to extend downwardly from the annular upper surface 57 to the lower casing base portion 33 and to be arranged along the circumferential direction R of the annular upper surface 57; and an annular recessed groove 62 which is formed in an annular lower surface 61 of the cylindrical protruding portion 37 and is open at the annular lower surface 61. Thus, the annular projecting portion 47 projects upwardly from the annular upper surface 45 of the annular lower flat portion 44 so as to form the outer annular recessed portion 48 in cooperation with the inner peripheral surface in the radial direction X of the annular engaged protruding portion 50 and the annular upper surface 45.

The cylindrical protruding portion 37 and the lower casing base portion 33 serve as the spring seat for the suspension coil spring, the annular lower surface 34 serves as the spring seat for the suspension coil spring, and a cylindrical outer peripheral surface 56 of the cylindrical protruding portion 37 is adapted to centrally position the suspension coil spring.

As shown in FIGS. 5 to 7, the engaging hole portions 59 are each provided with an opening portion 60 having a rectangular shape in a plan view and extending in a circular arc shape in the circumferential direction, and are formed such that an opposing pair of walls 60a on the long side defining each engaging hole portion 59 gradually approach each other as they extend downwardly.

An end portion 63 of the cylindrical outer peripheral surface 56 of the cylindrical protruding portion 37 with the annular recessed groove 62 formed therein is formed as an annular tapered surface 64 which gradually expands outwardly in the radial direction X toward the annular lower surface 61, and flexibility in the radial direction X is imparted to an end portion 65 of the cylindrical protruding portion 37 where the annular tapered surface 64 is formed.

A radial annular inner peripheral surface of the annular flat plate portion 52 forms an annular recessed portion 68 having a wide annular bottom surface 67 continuously connected to the cylindrical outer peripheral surface 56 of the cylindrical protruding portion 37 in cooperation with the annular lower surface 34 of the lower casing base portion 33 and an annular lower surface 66 of the annular lower flat portion 44 continuously connected to that annular lower surface 34.

A plurality of notched grooves 69 which are open at the annular upper surface 32 and the cylindrical inner peripheral surface 36 are formed in the cylindrical inner peripheral surface 35 of the lower casing base portion 33 in such a manner as to be arranged along the circumferential direction R. These notched grooves 69 make uniform the thickness of the lower casing base portion 33 by reducing as practically as possible such defects as sink marks during the molding of the lower casing 3.

An annular reinforcing rib 69a is integrally formed on the cylindrical inner peripheral surface 36 of the cylindrical protruding portion 37 formed on the lower casing base portion 33 in such a manner as to protrude downwardly, and the reinforcing rib 69a enhances the strength in the radial direction X of the cylindrical protruding portion 37.

Figure 8:
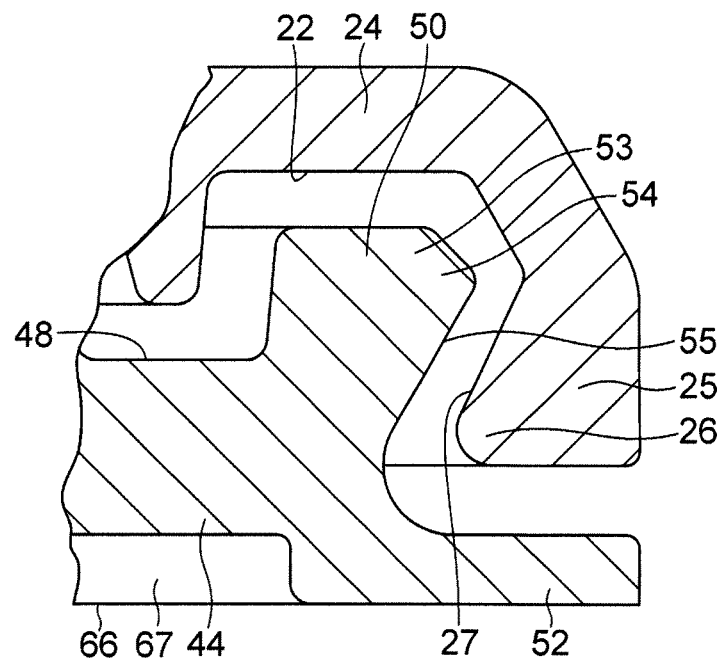
FIG. 8 is an explanatory enlarged cross-sectional view of resiliently fitting portions of the upper casing and the lower casing in the embodiment shown in FIG. 1.

As particularly shown in FIGS. 1, 3, and 8, the upper casing 2 is combined with the lower casing 3 such that the inner annular suspended portion 19 and the outer annular suspended portion 21 are respectively opposed to the inner annular recessed portion 46 and the outer annular recessed portion 48, and the inner annular suspended portion 19 and the outer annular suspended portion 21 are respectively overlapped with the annular projecting portion 47 in the radial direction X, and such that the inclined engaging surface 27 of the engaging bulged portion 26 is resiliently fitted to the inclined engaged surface 55 of the engaged bulged portion 54.

As the upper casing 2 and the lower casing 3 are thus combined by being resiliently fitted to each other, sealing portions for performing labyrinth action are formed on the outer peripheral side of the sliding bearing 1, i.e., in the overlapped section between and including the annular projecting portion 47, on the one hand, and the inner annular suspended portion 19 and the outer annular suspended portion 21, on the other hand, and in the resiliently fitted section between and including the inclined engaging surface 27 and the inclined engaged surface 55.

As the sealing portions for performing labyrinth action are formed on the outer peripheral side of the sliding bearing 1, it is possible to prevent the ingress of dust and the like onto the sliding portions between the upper casing 2 and the sliding bearing piece 5 disposed in the space S between the upper casing 2 and the lower casing 3.

In addition, since the annular clearance of the resiliently fitted section between and including the annular engaging suspended portion 24 of the upper casing 2 and the annular engaged protruding portion 50 of the lower casing 3 is covered by the annular flat plate portion 52 which is continuously connected to the annular engaged protruding portion 50, it is possible to further prevent the ingress of dust and the like from the annular clearance of that resiliently fitted section.

Figure 9:
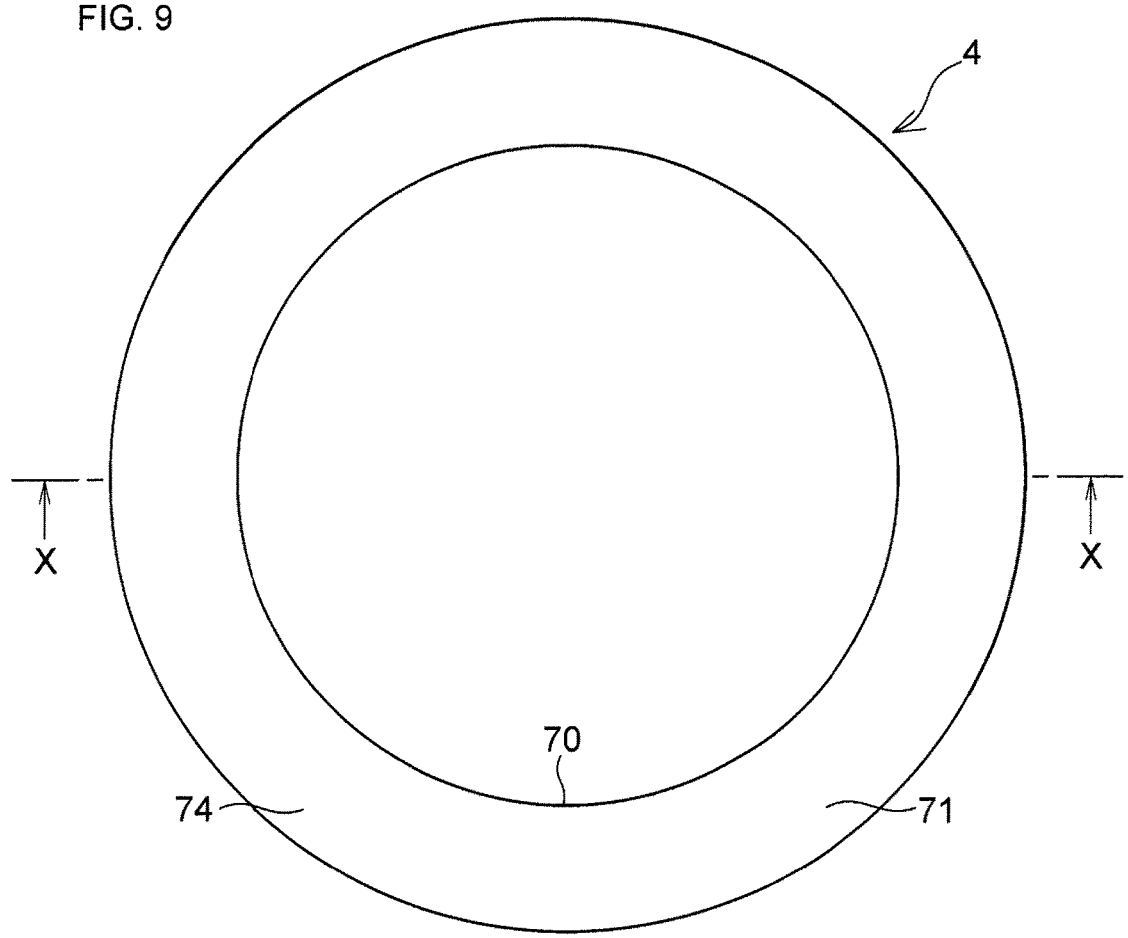
FIG. 9 is an explanatory plan view of a reinforcing member shown in FIG. 1.
Figure 10:
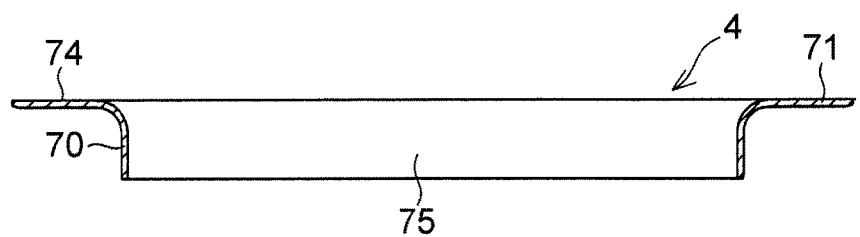
FIG. 10 is an explanatory cross-sectional view, taken in the direction of arrows X-X, of the reinforcing member shown in FIG. 9.
Figure 11:
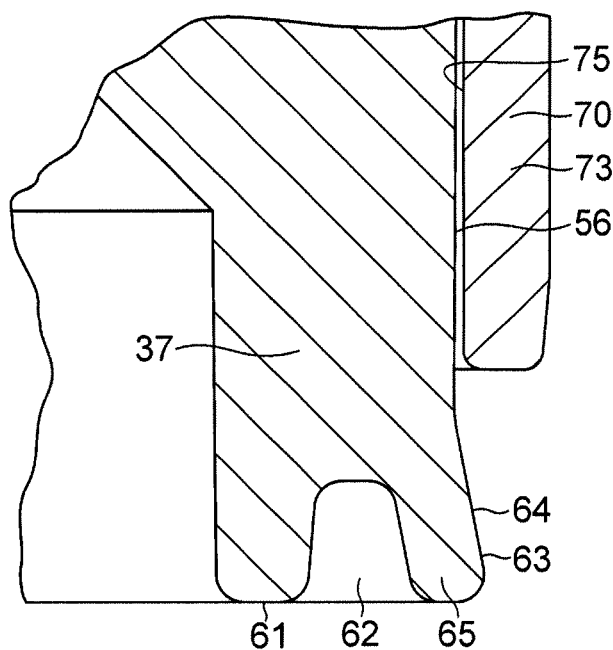
FIG. 11 an explanatory enlarged cross-sectional view of fitting portions of the reinforcing member and the lower casing in the embodiment shown in FIG. 1.
Figure 12:
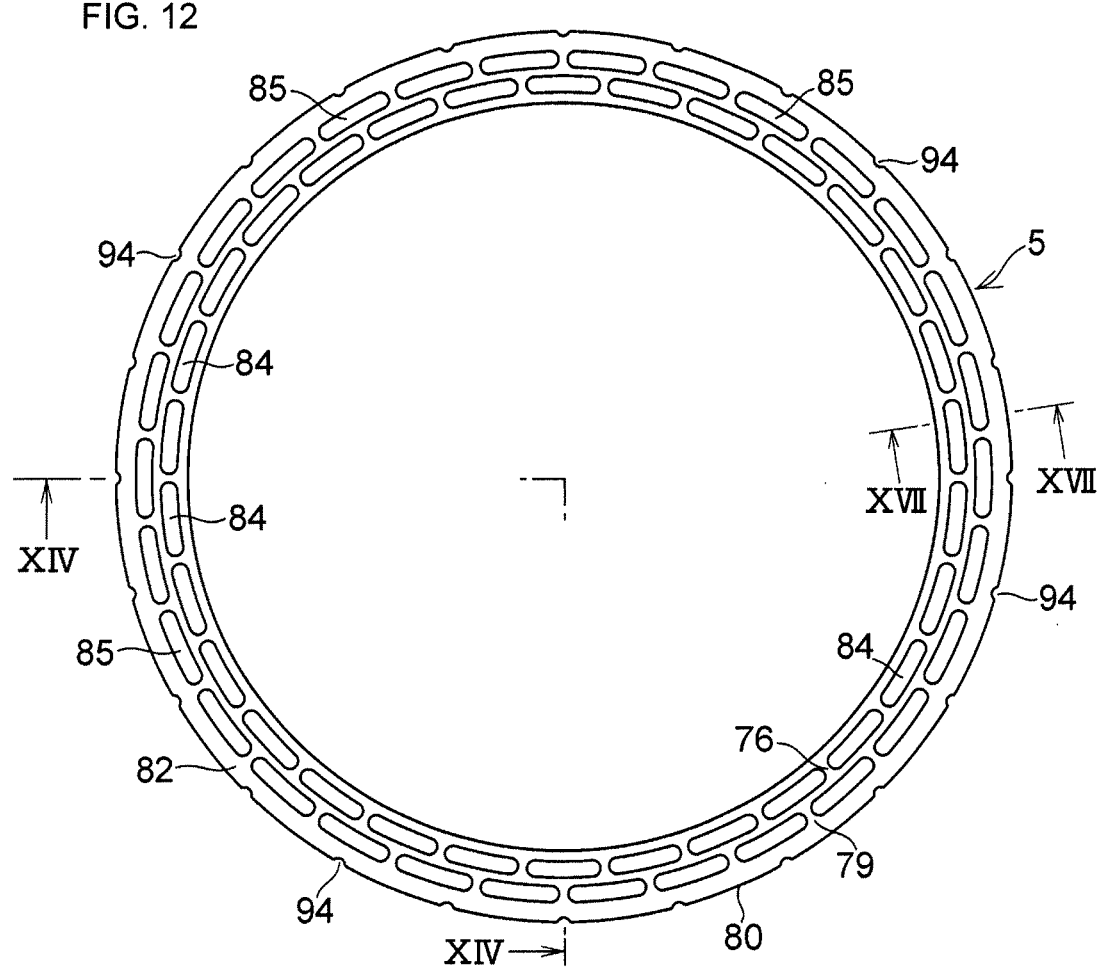
FIG. 12 is an explanatory plan view of a sliding bearing piece in the embodiment shown in FIG. 1.
Figure 13:
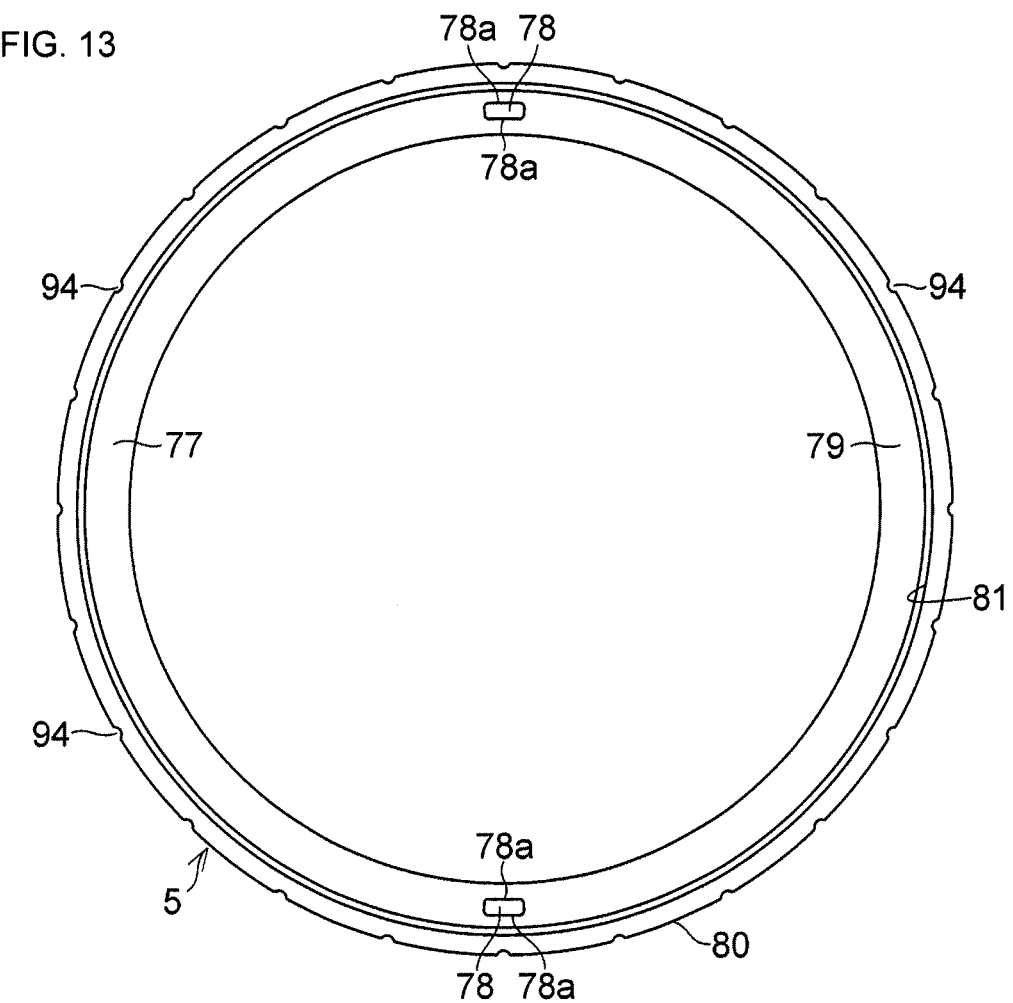
FIG. 13 is an explanatory bottom view of the sliding bearing piece in the embodiment shown in FIG. 1.
Figure 14:
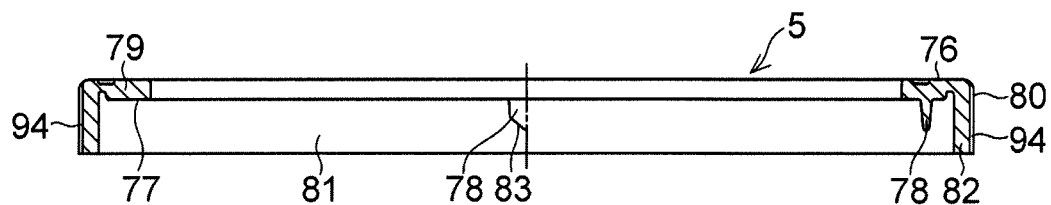
FIG. 14 is an explanatory cross-sectional view, taken in the direction of arrows along line XIV-XIV, of the sliding bearing piece shown in FIG. 12.
Figure 15:
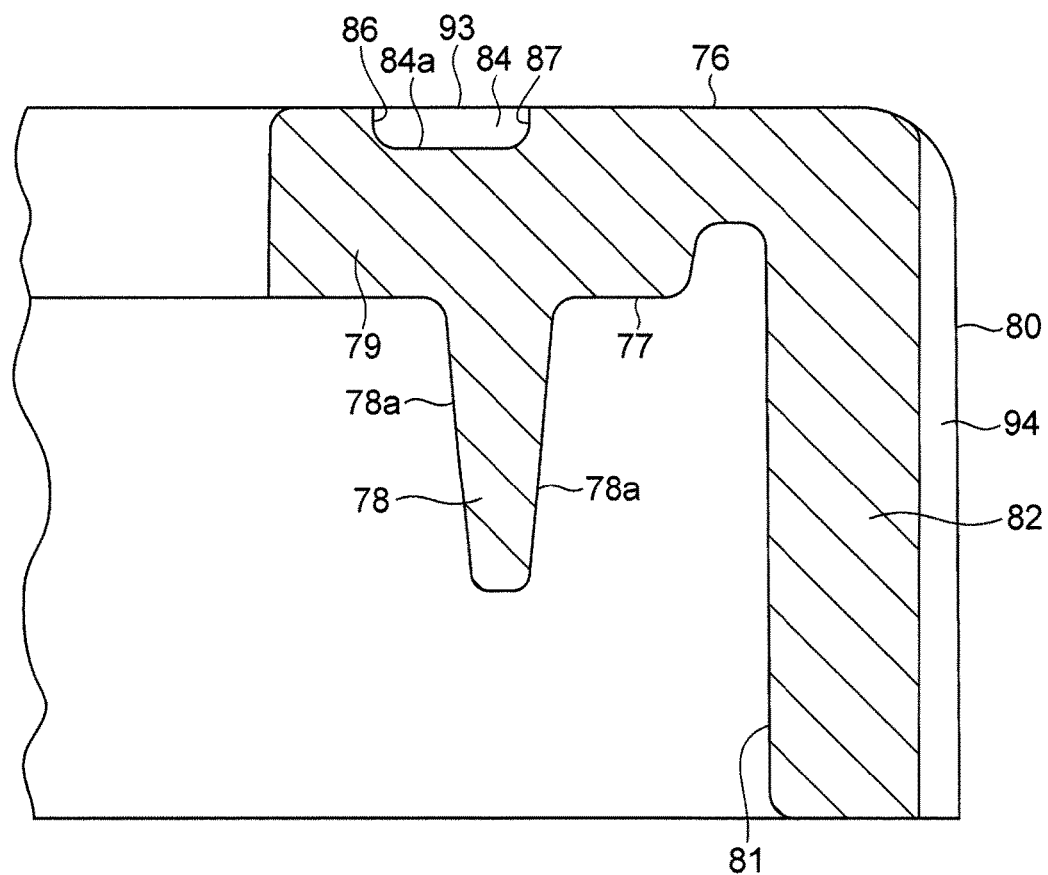
FIG. 15 is an explanatory partially enlarged cross-sectional view of the sliding bearing piece shown in FIG. 1.
Figure 16:
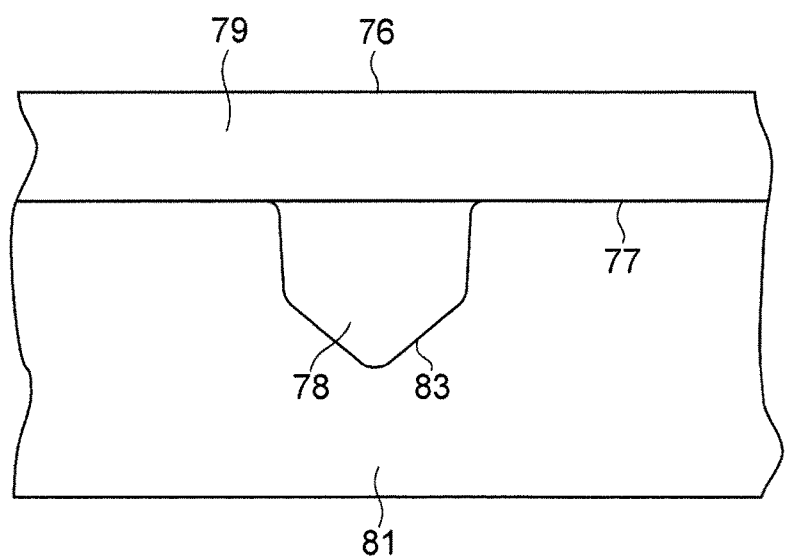
FIG. 16 is an explanatory partially enlarged cross-sectional view of the sliding bearing piece shown in FIG. 1.
Figure 17:
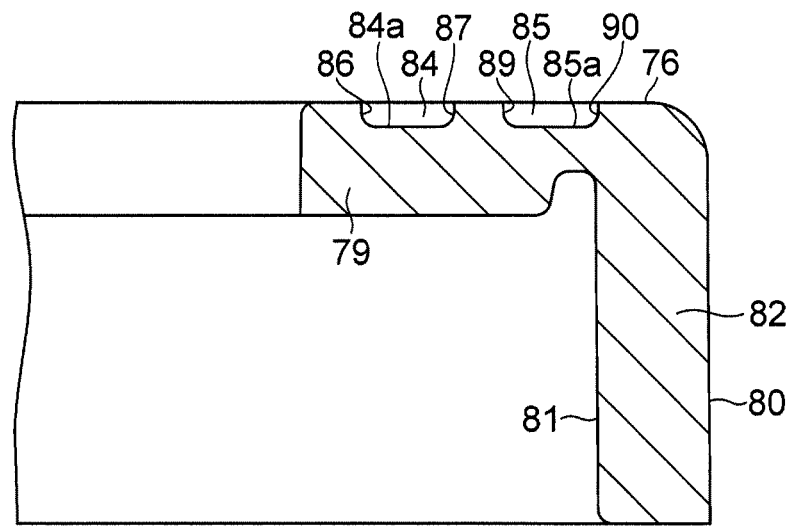
FIG. 17 is an explanatory cross-sectional view, taken in the direction of arrows along line XVII-XVII, of the sliding bearing piece shown in FIG. 12.
Figure 18:
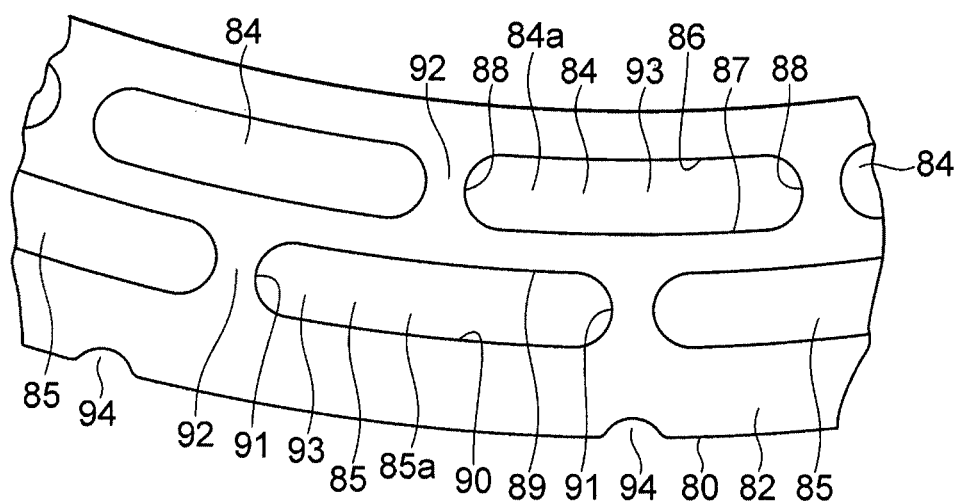
FIG. 18 is an explanatory partially enlarged cross-sectional view of the sliding bearing piece shown in FIG. 1.
Figure 19:
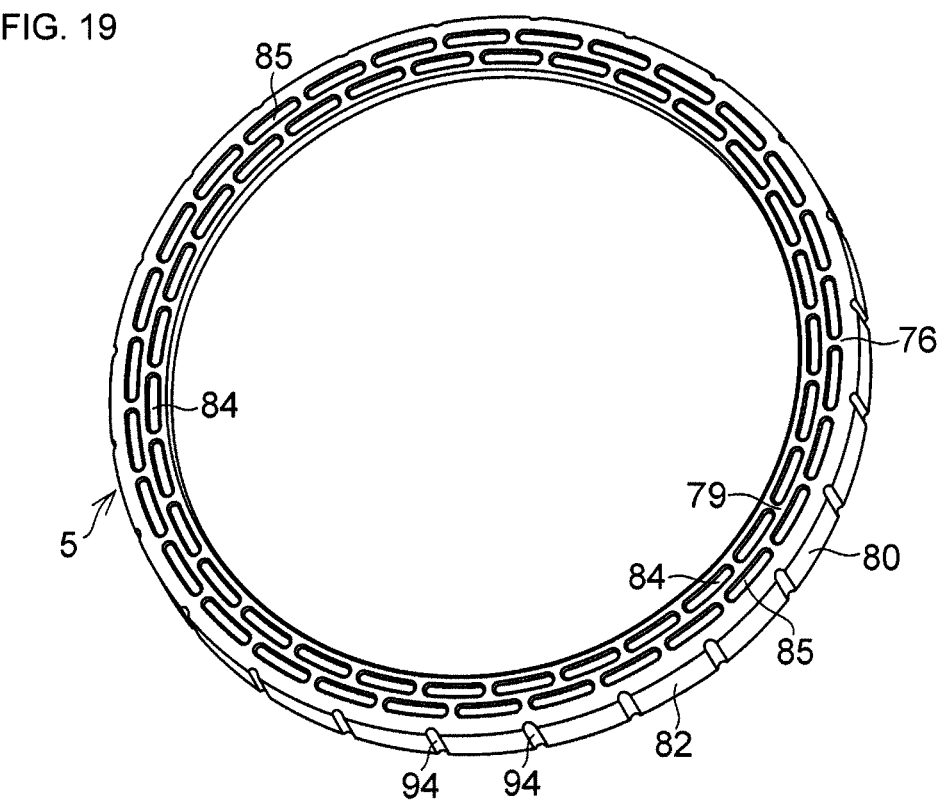
FIG. 19 is an explanatory perspective view of the sliding bearing piece shown in FIG. 1.

As particularly shown in FIGS. 9 to 11, the metallic reinforcing member 4 has a cylindrical portion 70 and an annular collar portion 71 extending outwardly in the radial direction X from one end portion of the cylindrical portion 70. As shown in FIGS. 1 and 3, the metallic reinforcing member 4 is fitted to the lower casing 3 by disposing the annular collar portion 71 in the annular recessed portion 68 and by fitting the cylindrical portion 70 over the cylindrical protruding portion 37, such that an upper surface 74 of the annular collar portion 71 is brought into contact with the annular lower surface 34 of the lower casing base portion 33 and the annular lower surface 66 of the annular lower flat portion 44 continuously connected to the annular lower surface 34, and such that a cylindrical inner peripheral surface 75 of the cylindrical portion 70 is brought into contact with the cylindrical outer peripheral surface 56 of the cylindrical protruding portion 37.

When the reinforcing member 4 is fitted to the lower casing 3, the end portion 65 of the cylindrical protruding portion 37 with the annular tapered surface 64 formed thereon undergoes elastic deformation by virtue of the flexibility thereof and facilitates the fitting of the cylindrical portion 70 of the reinforcing member 4 over the cylindrical protruding portion 37, and is, after the fitting, elastically restored outwardly in the radial direction X of the cylindrical outer peripheral surface 56 of the cylindrical protruding portion 37 to thereby prevent the downwardly coming off of the cylindrical portion 70 from the cylindrical protruding portion 37; therefore, it becomes possible to handle the lower casing 3 and the reinforcing member 4 as an integral unit. Thus, the reinforcing member 4 at the cylindrical portion 70 is prevented from coming off downwardly from the cylindrical protruding portion 37 by virtue of the end portion 63 of the cylindrical outer peripheral surface 56 which is formed as the annular tapered surface 64 of the end portion 65 of the cylindrical protruding portion 37 with the annular recessed groove 62 formed therein and which is enlarged in diameter outwardly in the radial direction X.

As the metallic reinforcing member 4 is disposed on the lower casing 3, the annular lower surface 34 of the lower casing 3 which serves as the spring seat of the suspension coil spring is reinforced by the annular collar portion 71 of the reinforcing member 4.

As particularly shown in FIGS. 12 to 19, the synthetic resin-made sliding bearing piece 5 disposed in the space S includes an annular thrust sliding bearing piece portion 79 having an annular upper surface 76 which is brought into slidable contact with the annular lower surface 6 of the upper casing base portion 8, an annular lower surface 77 which is brought into contact with the annular upper surface 57 of the annular protruding portion 42 of the lower casing 3, and two engaging protruding portions 78 which project downwardly from the annular lower surface 77, are respectively fittingly inserted in the engaging hole portions 59 of the lower casing 3, and are arranged in face-to-face relation in the radial direction X, as well as a cylindrical radial sliding bearing piece portion 82 which, at an one end portion thereof, is integrally formed on one annular end portion of the thrust sliding bearing piece portion 79 in such a manner as to extend downwardly from the one annular end portion of the thrust sliding bearing piece portion 79, and has a cylindrical outer peripheral surface 80 in the radial direction X which is brought into slidable contact with the cylindrical inner peripheral surface 17 of the outer peripheral-side cylindrical suspended portion 12 and the cylindrical inner peripheral surface 18 of the inner annular suspended portion 19 and a cylindrical inner peripheral surface 81 which is brought into contact with the cylindrical outer peripheral surface 40 of the lower casing base portion 33 and the cylindrical outer peripheral surface 41 of the annular protruding portion 42 continuously connected to the cylindrical outer peripheral surface 40.

The engaging protruding portion 78, is integrally formed on the annular lower surface 77 of the thrust sliding bearing piece portion 79, protrudes downwardly from the lower surface 77, and has a rectangular shape in a cross-sectional view, and a pair of walls 78a on a long side thereof which are gradually tapered toward a distal end portion on the lower side thereof and each has an acute-angled tapered surface 83 at the distal end portion.

The thrust sliding bearing piece portion 79 has pluralities of inner recessed portions 84 and outer recessed portions 85 which are formed on the annular upper surface 76 along the circumferential direction R and in at least two rows including an inner row and an outer row in the radial direction X, the inner recessed portions 84 and the outer recessed portions 85 being arranged with phase differences with respect to each other in the circumferential direction R.

Each of the plurality of inner recessed portions 84 formed in the inner row is defined by an inner circular arc-shaped wall surface 86 which extends in a circular arc shape about the axis O as the center; an outer circular arc-shaped wall surface 87 which extends in a circular arc shape about the axis O as the center outwardly of the inner circular arc-shaped wall surface 86 in the radial direction X, i.e., whose diameter is enlarged in the radial direction X relative to the inner circular arc-shaped wall surface 86; a pair of semicircular wall surfaces 88 respectively continuously connected to the inner circular arc-shaped wall surface 86 and the outer circular arc-shaped wall surface 87 and opposed to each other in the circumferential direction R; and a bottom wall surface 84a continuously connected to respective ones of the inner circular arc-shaped wall surface 86, the outer circular arc-shaped wall surface 87, and the pair of semicircular wall surfaces 88.

Each of the plurality of outer recessed portions 85 formed in the outer row is defined by an inner circular arc-shaped wall surface 89 which extends in a circular arc shape about the axis O as the center; an outer circular arc-shaped wall surface 90 which extends in a circular arc shape about the axis O as the center outwardly of the inner circular arc-shaped wall surface 89 in the radial direction X, i.e., whose diameter is enlarged in the radial direction X relative to the inner circular arc-shaped wall surface 89; a pair of semicircular wall surfaces 91 respectively continuously connected to both the inner circular arc-shaped wall surface 89 and the outer circular arc-shaped wall surface 90 and opposed to each other in the circumferential direction R; and a bottom wall surface 85a continuously connected to respective ones of the inner circular arc-shaped wall surface 89, the outer circular arc-shaped wall surface 90, and the pair of semicircular wall surfaces 91. Each outer recessed portion 85 is arranged at a position corresponding to a discontinuous portion 92 in the circumferential direction R between adjacent ones of the inner recessed portions 84 formed in the inner row. Thus, the inner recessed portions 84 and the outer recessed portions 85 are arranged with phase differences with respect to each other in the circumferential direction R.

The pluralities of inner recessed portions 84 and outer recessed portions 85, which are formed on the annular upper surface 76 of the thrust sliding bearing piece portion 79 along the circumferential direction R and in at least two rows including the inner row and the outer row in the radial direction X, are arranged such that the ratio of the total area of opening surfaces 93 of the inner recessed portions 84 and the outer recessed portions 85 in total surfaces which combine the opening surfaces 93 of the inner recessed portions 84 and the outer recessed portions 85 and the annular upper surface 76 of the thrust sliding bearing piece portion 79, i.e., a thrust sliding bearing surface, is 20 to 50%, preferably 30 to 40%.

As particularly shown in FIGS. 12 to 15 and FIGS. 18 and 19, the radial sliding bearing piece portion 82 has a plurality of axial grooves 94 which are open at their both ends in the vertical direction and are formed on the cylindrical outer peripheral surface 80 by being spaced apart at equal intervals in the circumferential direction R.

The pluralities of inner recessed portions 84 and outer recessed portions 85, which are formed in the annular upper surface 76 of the thrust sliding bearing piece portion 79 along the circumferential direction R and in at least two rows including the inner row and the outer row in the radial direction X, as well as the plurality of axial grooves 94 which are formed on the cylindrical outer peripheral surface 80 of the radial sliding bearing piece portion 82, serve as a sump section for lubricating oil such as grease.

Figure 20:
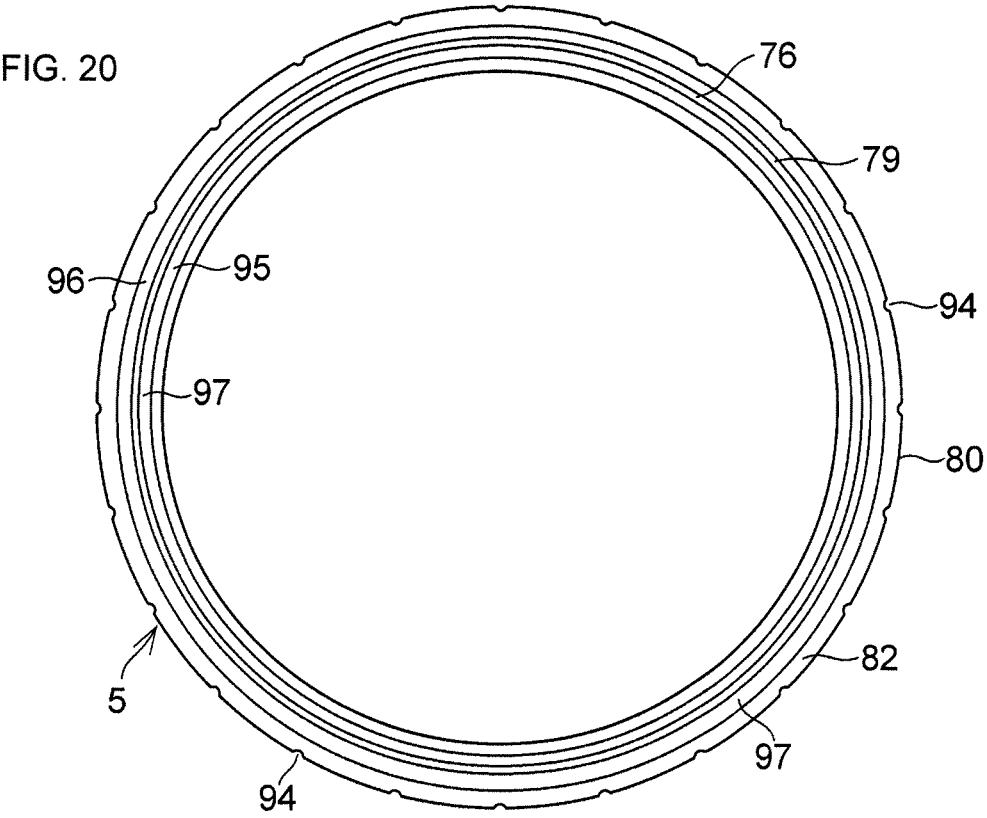
FIG. 20 is an explanatory plan view of another example of the sliding bearing piece shown in FIG. 1.

As shown in FIG. 20, the sliding bearing piece 5 may have an inner annular recessed groove 95 and an outer annular recessed groove 96 which are formed on the annular upper surface 76 along the circumferential direction R and in two rows including an inner row and an outer row concentrically with each other in the radial direction X.

The inner annular recessed groove 95 and the outer annular recessed groove 96, which are formed on the annular upper surface 76 of the thrust sliding bearing piece portion 79 along the circumferential direction R and in at least two rows including the inner row and the outer row in the radial direction X concentrically with each other, are arranged such that the ratio of the total area of opening surfaces 97 of the inner annular recessed groove 95 and the outer annular recessed groove 96 in total surfaces which combine the opening surfaces 97 of the inner annular recessed groove 95 and the outer annular recessed groove 96 and the annular upper surface 76 of the thrust sliding bearing piece portion 79, i.e., a thrust sliding bearing surface, is 20 to 50%, preferably 30 to 40%.

According to the thrust sliding bearing piece portion 79 of the sliding bearing piece 5 thus formed, since at least one group of the inner recessed portions 84 and the outer recessed portions 85 as well as the inner annular recessed groove 95 and the outer annular recessed groove 96 is formed in the annular upper surface 76, the area of contact between the annular upper surface 76, which is the thrust sliding bearing surface and serves as the sliding surface, and the mating member, i.e., the annular lower surface 6 of the upper casing base portion 8, is reduced in the relative sliding in the circumferential direction R about the axis O between the annular upper surface 76 of the thrust sliding bearing piece portion 79 and the annular lower surface 6 of the upper casing base portion 8. This makes it possible to increase the surface pressure (load per unit area) acting on the annular upper surface 76, thereby making it possible to attain further lower friction through a combination of the lower friction due to the friction between the synthetic resins and the lower friction due to the presence on the sliding surfaces of the lubricating oil which is filled in at least one group of the inner recessed portions 84 and the outer recessed portions 85 as well as the inner annular recessed groove 95 and the outer annular recessed groove 96.

As shown in FIGS. 1 and 3, the sliding bearing piece 5 is fixed to the lower casing 3 such that a rotation thereof in the circumferential direction R about the axis O with respect to the lower casing 3 is prevented by causing the engaging protruding portions 78 protruding from the annular lower surface 77 of the thrust sliding bearing piece portion 79 to be fittingly inserted in the engaging hole portions 59 formed in the annular protruding portion 42 of the lower casing 3, by causing the annular lower surface 77 to be brought into contact with the annular upper surface 57 of the annular protruding portion 42, and by causing the cylindrical inner peripheral surface 81 of the radial sliding bearing piece portion 82 to be brought into contact with the cylindrical outer peripheral surface 41 of the annular protruding portion 42 and the cylindrical outer peripheral surface 40 of the lower casing base portion 33. The sliding bearing piece 5 is disposed in the space S between the upper casing 2 and the lower casing 3 such that the annular upper surface 76 of the thrust sliding bearing piece portion 79 is brought into slidable contact with the annular lower surface 6 of the upper casing base portion 8, and such that the cylindrical outer peripheral surface 80 of the radial sliding bearing piece portion 82 is brought into slidable contact with the cylindrical inner peripheral surface 17 of the outer peripheral-side cylindrical suspended portion 12 and the cylindrical inner peripheral surface 18 of the inner annular suspended portion 19 of the upper casing 2.

Figure 21:
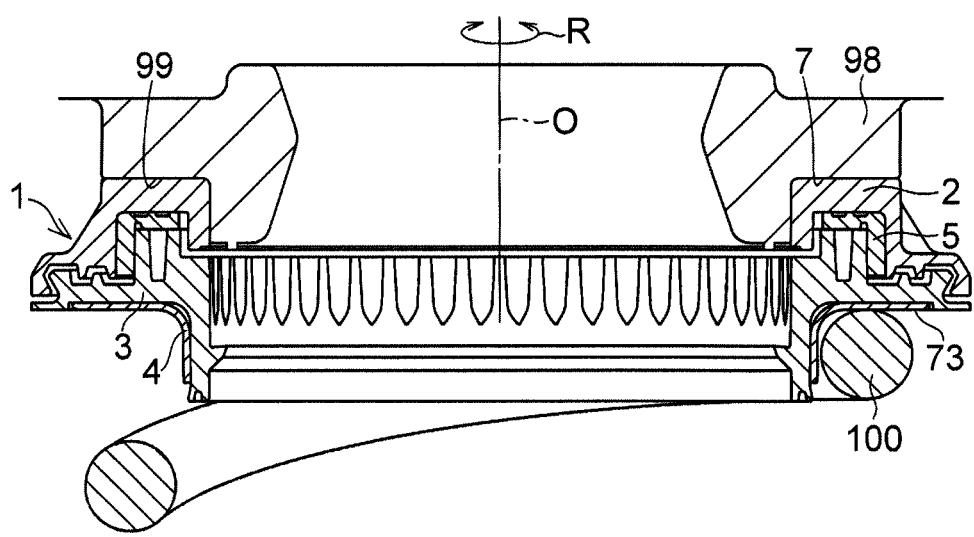
FIG. 21 is an explanatory cross-sectional view in which the sliding bearing of the embodiment shown in FIG. 1 is incorporated in a strut-type suspension.

As shown in FIG. 21, for example, the synthetic resin-made sliding bearing 1 in accordance with this embodiment may be applied to a strut-type suspension in a four-wheeled motor vehicle by disposing the synthetic resin-made sliding bearing 1 in accordance with this embodiment between a vehicle body-side bearing surface 99 of a vehicle body-side mounting member 98 and an upper end portion of a suspension coil spring 100 such that the annular upper surface 7 of the upper casing 2 is brought into contact with the vehicle body-side bearing surface 99 of the vehicle body-side mounting member 98, and such that the annular lower surface 34 of the lower casing 3 as a spring bearing surface, or the annular collar portion 71 of the metallic reinforcing member 4 disposed on the annular lower surface 34 of the lower casing 3, is brought into contact with the upper end portion of the suspension coil spring 100.

In the strut-type suspension shown in FIG. 21, the relative rotation in the circumferential direction R of the suspension coil spring 100 with respect to the vehicle body-side mounting member 98 is allowed in the sliding bearing 1 by the relative sliding in the circumferential direction R of each of the annular upper surface 76 of the thrust sliding bearing piece portion 79 with respect to the annular lower surface 6 of the upper casing base portion 8, as well as the cylindrical outer peripheral surface 80 of the radial sliding bearing piece portion 82 with respect to the cylindrical inner peripheral surface 17 of the outer peripheral-side cylindrical suspended portion 12 and the cylindrical inner peripheral surface 18 of the inner annular suspended portion 19.

DESCRIPTION OF REFERENCE NUMERALS

1: sliding bearing
2: upper casing
3: lower casing
4: reinforcing member
5: sliding bearing piece
6: annular lower surface
8: upper casing base portion
12: outer peripheral cylindrical suspended portion
14: annular upper flat portion
24: annular engaging suspended portion
27: inclined engaging portion
33: lower casing base portion
42: annular protruding portion
50: annular engaged protruding portion
55: inclined engaged surface
59: engaging hole portion
78: engaging protruding portion
79: thrust sliding bearing piece portion
82: radial sliding bearing piece portion

The invention claimed is:

1. A synthetic resin-made sliding bearing comprising: a synthetic resin-made upper casing, a reinforced synthetic resin-made lower casing superposed on said upper casing so as to be rotatable about an axis relative to said upper casing, and a synthetic resin-made sliding bearing piece disposed between said upper casing and said lower casing,
wherein said upper casing includes: an annular upper casing base portion having an annular lower surface; an inner peripheral-side cylindrical suspended portion suspended from a radial inner peripheral end portion of an annular lower surface of the upper casing base portion; an outer peripheral-side cylindrical suspended portion suspended from a radial outer peripheral end portion of the annular lower surface of the upper casing base portion; an annular upper flat portion extending radially outwardly from a lower end portion of the outer peripheral-side cylindrical suspended portion; an annular engaging suspended portion suspended from a radially outer peripheral end portion of the annular upper flat portion; and an engaging bugled portion having an annular inclined engaging surface and bulging radially inwardly from a radially inner surface of a lower portion of the annular engaging suspended portion,
wherein said lower casing includes: an annular lower casing base portion which has an annular upper surface and a cylindrical inner peripheral surface; a cylindrical protruding portion which has a cylindrical inner peripheral surface continuously connected to the cylindrical inner peripheral surface of the lower casing base portion and protrudes downwardly from a lower surface of a radially inner peripheral end portion of the lower casing base portion; an annular protruding portion which protrudes upwardly from the annular upper surface of the lower casing base portion; an annular lower flat portion extending radially outwardly from a radially outer peripheral lower end portion of the lower casing base portion; an annular engaged protruding portion which protrudes upwardly from a radially outer peripheral end portion of the annular lower flat portion; an engaged bulged portion bulging radially outwardly from a radially outer surface of an upper portion of the annular engaged protruding portion and having an annular inclined engaged surface; and at least one engaging hole portion which is formed in an annular upper surface of the annular protruding portion so as to be open at the annular upper surface and to extend downwardly from the annular upper surface, and
wherein said sliding bearing piece includes: an annular thrust sliding bearing piece portion having an annular upper surface, an annular lower surface, and at least one engaging protruding portion which projects downwardly from the annular lower surface and is fittingly inserted in the engaging hole portion of said lower casing; and a cylindrical radial sliding bearing piece portion which, at an one end portion thereof, is integrally formed on one annular end portion of the thrust sliding bearing piece portion and extends downwardly from the one annular end portion of the thrust sliding bearing piece portion, and has a cylindrical inner peripheral surface and a cylindrical outer peripheral surface, said sliding bearing piece being disposed between said upper casing and said lower casing such that the annular upper surface of the thrust sliding bearing piece portion is brought into slidable contact with the annular lower surface of the upper casing base portion, and the annular lower surface of the thrust sliding bearing piece portion is brought into contact with the annular upper surface of the annular protruding portion, and such that the cylindrical inner peripheral surface of the radial sliding bearing piece portion is brought into contact with a cylindrical outer peripheral surface of the lower casing base portion and a cylindrical outer peripheral surface of the annular protruding portion, and the cylindrical outer peripheral surface of the radial sliding bearing piece portion is brought into slidable contact with a cylindrical inner peripheral surface of the outer peripheral-side cylindrical suspended portion, said upper casing being combined with said lower casing by causing the inclined engaging surface to be resiliently fitted to the inclined engaged surface of said lower casing.

2. The synthetic resin-made sliding bearing according to claim 1, wherein said upper casing further includes an inner annular suspended portion which has a cylindrical inner peripheral surface continuously connected to a cylindrical inner peripheral surface of the outer peripheral-side cylindrical suspended portion and is suspended from a radially inner peripheral end portion of the annular upper flat portion; and an outer annular suspended portion suspended from the annular lower surface of the annular upper flat portion, so as to form an inner annular recessed portion radially inwardly in cooperation with the radially outer peripheral surface of the inner annular suspended portion and the annular lower surface of the annular upper flat portion and to form an outer annular recessed portion radially outwardly in cooperation with the radially inner peripheral surface of the annular engaging suspended portion and the annular lower surface of the annular upper flat portion, and wherein said lower casing further includes an annular projecting portion projecting upwardly from the annular upper surface of the annular lower flat portion so as to form an inner annular recessed portion radially inwardly in cooperation with the cylindrical outer peripheral surface of the lower casing base portion and the annular upper surface of the annular lower flat portion and to form an outer annular recessed portion in cooperation with a radially inner peripheral surface of the annular engaged protruding portion and the annular upper surface of the annular lower flat portion; and an annular stepped portion formed by a radially inner end portion of the annular upper surface of the lower casing base portion and a cylindrical inner peripheral surface of the annular protruding portion adjacent to that end portion, sealing portions for performing labyrinth action being formed in an overlapped section between and including the annular projecting portion of said lower casing, on the one hand, and the inner annular suspended portion and the outer annular suspended portion of said upper casing, on the other hand, and in a resiliently fitted section between and including the inclined engaging surface and the inclined engaged surface, by overlapping the annular projecting portion of said lower casing with each of the inner annular suspended portion and the outer annular suspended portion of said upper casing.

3. The synthetic resin-made sliding bearing according to claim 1, wherein said lower casing further includes an annular flat plate portion integrally extending radially outwardly from the outer peripheral end portion of the annular lower flat portion.

4. The synthetic resin-made sliding bearing according to claim 1, further comprising a metallic reinforcing member which has a cylindrical portion and an annular collar portion extending radially outwardly from one end portion of the cylindrical portion, wherein said lower casing further includes an annular recessed groove which is formed in an annular lower surface of the cylindrical protruding portion, and an end portion of the cylindrical outer peripheral surface of the cylindrical protruding portion with the annular recessed groove formed therein is formed as an annular tapered surface which gradually expands radially outwardly toward the annular lower surface, and wherein said metallic reinforcing member is fitted to said lower casing by causing a cylindrical inner peripheral surface of the cylindrical portion to be brought into contact with the cylindrical outer peripheral surface of the cylindrical protruding portion and by causing an upper surface of the annular collar portion to be brought into contact with an annular lower surface of the lower casing base portion and an annular lower surface of the annular lower flat portion, and said reinforcing member at the cylindrical portion is prevented from coming off downwardly from the cylindrical protruding portion by the end portion of the cylindrical outer peripheral surface which is formed as the annular tapered surface of the end portion of the cylindrical protruding portion with the annular recessed groove formed therein and which is enlarged in diameter radially outwardly.

5. The synthetic resin-made sliding bearing according to claim 1, wherein the thrust sliding bearing piece portion has pluralities of inner recessed portions and outer recessed portions which are formed in the annular upper surface along a circumferential direction and in at least two rows including an inner row and an outer row in the radial direction, the inner recessed portions and the outer recessed portions are arranged with phase differences with respect to each other in the circumferential direction, and the radial sliding bearing piece portion has a plurality of axial grooves which are open at their both vertical ends and are formed on the cylindrical outer peripheral surface by being spaced apart at equal intervals in the circumferential direction.

6. The synthetic resin-made sliding bearing according to claim 5, wherein each of the plurality of inner recessed portions is defined by an inner circular arc-shaped wall surface extending in a circular arc shape about the axis as a center; an outer circular arc-shaped wall surface extending in a circular arc shape about the axis as the center radially outwardly of the inner circular arc-shaped wall surface; a pair of semicircular wall surfaces respectively continuously connected to the inner circular arc-shaped wall surface and the outer circular arc-shaped wall surface and opposed to each other in the circumferential direction; and a bottom wall surface continuously connected to respective ones of the inner circular arc-shaped wall surface, the outer circular arc-shaped wall surface, and the pair of semicircular wall surfaces.

7. The synthetic resin-made sliding bearing according to claim 5, wherein each of the plurality of outer recessed portions is defined by an inner circular arc-shaped wall surface extending in a circular arc shape about the axis as a center; an outer circular arc-shaped wall surface extending in a circular arc shape about the axis as the center radially outwardly of the inner circular arc-shaped wall surface; a pair of semicircular wall surfaces respectively continuously connected to the inner circular arc-shaped wall surface and the outer circular arc-shaped wall surface and opposed to each other in the circumferential direction; and a bottom wall surface continuously connected to respective ones of the inner circular arc-shaped wall surface, the outer circular arc-shaped wall surface, and the pair of semicircular wall surfaces.

8. The synthetic resin-made sliding bearing according to claim 5, wherein a ratio of a total area of opening surfaces of the pluralities of inner recessed portions and outer recessed portions in surfaces which combine the opening surfaces of the pluralities of inner recessed portions and outer recessed portions and the annular upper surface of the thrust sliding bearing piece portion is 20 to 50%.

9. The synthetic resin-made sliding bearing according to claim 5, wherein the thrust sliding bearing piece portion further has annular recessed grooves which are formed in the annular upper surface along the circumferential direction and in at least two rows including an inner row and an outer row in the radial direction and formed concentrically with each other.

10. The synthetic resin-made sliding bearing according to claim 9, wherein a ratio of a total area of opening surfaces of the pluralities of inner recessed portions and outer recessed portions and opening surfaces of the annular recessed grooves in surfaces which combine the opening surfaces of the pluralities of inner recessed portions and outer recessed portions, opening surfaces of the annular recessed grooves, and the annular upper surface of the thrust sliding bearing piece portion is 20 to 50%.

11. The synthetic resin-made sliding bearing according to claim 1, wherein the thrust sliding bearing piece portion has annular recessed grooves which are formed in the annular upper surface along a circumferential direction and in at least two rows including an inner row and an outer row in the radial direction.

12. The synthetic resin-made sliding bearing according to claim 11, wherein a ratio of a total area of opening surfaces of the annular recessed grooves in total surfaces which combine the opening surfaces of the annular recessed grooves and the annular upper surface of the thrust sliding bearing piece portion is 20 to 50%.

\* \* \* \* \*